(12) United States Patent
Kubala et al.

(10) Patent No.: US 7,761,521 B2
(45) Date of Patent: Jul. 20, 2010

(54) METHOD AND SYSTEM FOR ACCOMMODATING MANDATORY RESPONSES IN ELECTRONIC MESSAGING

(75) Inventors: Michael Kubala, Austin, TX (US);
David Kulczar, Austin, TX (US);
Leonel Saenz, III, Austin, TX (US);
Thanh K. Tran, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1518 days.

(21) Appl. No.: 11/089,388

(22) Filed: Mar. 24, 2005

(65) Prior Publication Data

US 2006/0218232 A1    Sep. 28, 2006

(51) Int. Cl.
*G06F 15/16* (2006.01)
(52) U.S. Cl. ...................................................... 709/206
(58) Field of Classification Search ......... 709/202–207, 709/217–219, 223–227, 230, 237–238, 245–248
See application file for complete search history.

(56) References Cited

U.S. PATENT DOCUMENTS

2002/0138522 A1*  9/2002  Muralidhar et al. ......... 707/526
2003/0153991 A1*  8/2003  Visser et al. .................. 700/79
2005/0228688 A1* 10/2005  Visser et al. ................... 705/1
2006/0010217 A1*  1/2006  Sood ........................... 709/206
2008/0120383 A1*  5/2008  Kumar et al. ............... 709/206
2008/0126951 A1*  5/2008  Sood et al. .................. 715/752

* cited by examiner

*Primary Examiner*—Asad M Nawaz
(74) *Attorney, Agent, or Firm*—Yee & Associates, P.C.; Jeffrey S. LaBaw

(57) ABSTRACT

A method, system, apparatus, or computer program product is presented for processing electronic messages. An electronic message is received for a recipient from a sender, and a data field is detected in the received electronic message that indicates a request by the sender for a response from the recipient for the received electronic message. The recipient is alerted to the detected request for the response for the received electronic message, and after alerting the recipient, actions are required by the recipient with respect to usage of a data processing system until the recipient uses the data processing system to send a response for the received electronic message to the sender. For example, the recipient can be prevented from closing a review of the received e-mail message, from deleting the received e-mail message, and from exiting the e-mail application until the recipient has responded to the received email message.

3 Claims, 7 Drawing Sheets

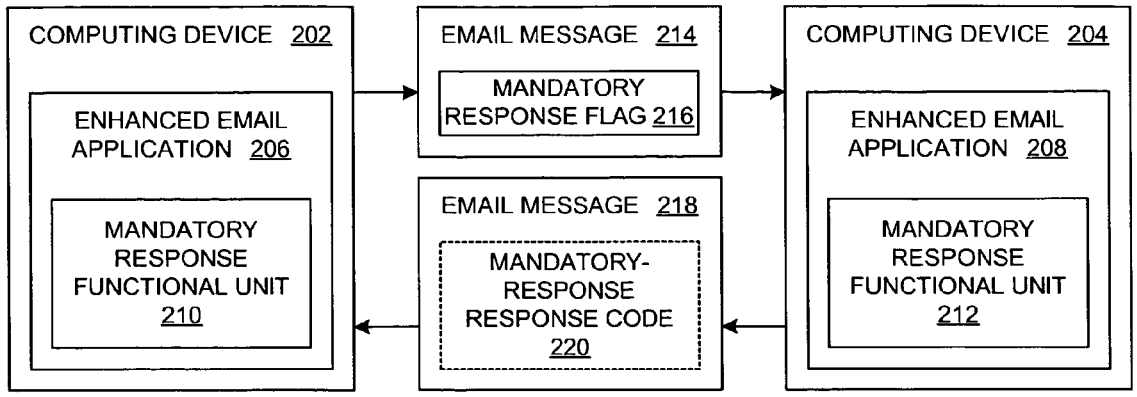

*FIG. 2*

```
        Message-ID: <BAY10-F27BA89BD946D0AA37A0@ibm.com>
        Received: from 61.64.67.100 by bay10.mail.ibm.com;
             Sat, 29 Jan 2005 20:53:59 GMT
        In-Reply-To: <BAY10-F18E133A529A4EBA3830@ibm.com>
304 ~  X-Mandatory-Response: 1.0
        From: "IBM ADMIN 93825" <admin93825@ibm.com>       > 302
        To: admin-hr@ibm.com
        Subject: New employee
        Date: Sat, 29 Jan 2005 15:53:59 -0500
        Mime-Version: 1.0
        Content-Type: text/plain; format=flowed
```

*FIG. 3*

```
        ...
        From: "IBM ADMIN 93825" <admin93825@ibm.com>
        To: admin-hr@ibm.com
        Subject: New employee
        Date: Sat, 29 Jan 2005 15:53:59 -0500
        ...
        Jane--Has the new employee arrived yet? --John    ⎫
                                                          ⎬ 404
402 ~  <x-mandatory-response: 1.0>                        ⎭
```

*FIG. 4*

METHOD AND SYSTEM FOR ACCOMMODATING MANDATORY RESPONSES IN ELECTRONIC MESSAGING

BACKGROUND OF THE INVENTION

1. Field of the Invention

The present invention relates to an improved data processing system and, in particular, to a method and apparatus for multicomputer data transferring. Still more particularly, the present invention provides a method and apparatus for e-mail message processing.

2. Description of Related Art

A significant portion of a typical work day for many white-collar employees centers around communication in various forms, e.g., meetings, phone calls, and various forms of electronic messaging, such as e-mail and instant messages. In some cases, a corporation may be able to identify that more frequent use of electronic communications has increased the productivity of the overall corporation, and the same may be true for certain employees.

However, in some cases, an employee can demonstrate that his or her productivity suffers in proportion to the number of e-mail messages that he or she receives. In general, though, the amount of communication that is accomplished by e-mail messages continues to increase. This situation is compounded by the ease with which employees are able to communicate with each other by e-mail messages. E-mail messages are easily sent to a recipient, and e-mail messages are easily queued in anticipation of a response. Hence, the volume of e-mail is problematic in some cases because the task of responding to e-mail messages consumes an increasingly larger portion of a typical information worker's day. Moreover, the act of responding to e-mail messages can become monotonous in addition to time-consuming, which may cause an employee to become careless in responding to important e-mail messages. Potential errors may include incorrect information within a response or undue delay by neglecting to respond to an important e-mail message. As a result, business processes may be effected in uncertain ways.

Productivity-enhancing features have been added to e-mail applications to assist workers in handling the larger workload that is represented by the larger volume of e-mail. Prior art solutions have provided the ability to mark an e-mail message with a priority flag that indicates a normal priority, a high priority, or a highest priority, thereby allowing an employee to identify and respond to the most important e-mail messages from the sender's perspective. Other prior art solutions have provided the ability to generate return receipts to the sender when the sender's e-mail message is received at its intended destination or when the recipient opens the e-mail message, thereby providing an acknowledgment that a particular message has been received and/or opened.

However, these solutions allow a recipient to determine how quickly the recipient will respond to an incoming e-mail message. For example, a recipient may open an e-mail message that is flagged as highest priority and then decide that the e-mail message does not represent an important matter, after which the recipient postpones the generation of a response. Many business processes are time-critical, though, and there is a need to provide features in e-mail applications that reduce the amount of time between the receipt of an important e-mail message by a recipient and the generation of a response to that e-mail message by the recipient.

Therefore, it would be advantageous to provide productivity-enhancing features within e-mail applications for the handling of email messages so that important messages receive the appropriate attention from the recipient of an e-mail message.

SUMMARY OF THE INVENTION

A method, system, apparatus, or computer program product is presented for processing electronic messages. An electronic message is received for a recipient from a sender, and a data field is detected in the received electronic message that indicates a request by the sender for a response from the recipient for the received electronic message. The recipient is alerted to the detected request for the response for the received electronic message, and after alerting the recipient, actions are required by the recipient with respect to usage of a data processing system until the recipient uses the data processing system to send a response for the received electronic message to the sender. For example, the recipient can be prevented from closing a review of the received e-mail message, from deleting the received e-mail message, and from exiting the e-mail application until the recipient has responded to the received email message.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 2 depicts a block diagram that shows an exchange of e-mail messages between email applications that have been enhanced to include functionality to implement an embodiment of the present invention;

FIG. 3 depicts an exemplary dataset in which a mandatory response flag may be embedded within a set of e-mail message headers;

FIG. 4 depicts an exemplary dataset in which a mandatory response flag may be embedded within an e-mail message body;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
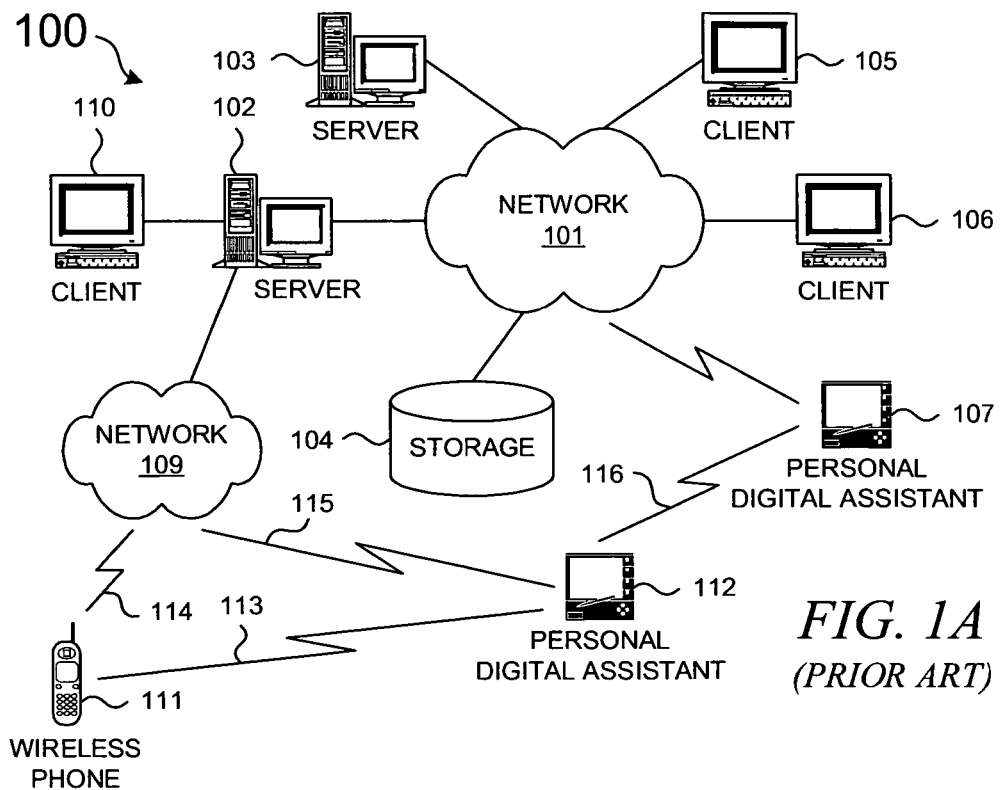
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport-Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports network 109 and client 110; network 109 incorporates wireless communication links. Network-enabled phone 111 and PDA 112 can directly transfer data between themselves across wireless link 113 using an appropriate technology, e.g., via Bluetooth™ wireless technology or Wi-Fi technology (IEEE 802.11) that allows the creation of so-called personal area networks (PAN) or personal ad-hoc networks. Phone 111 connects to network 109 through wireless link 114, and PDA 113 connects to network 109 through wireless link 115. In a similar manner, PDA 113 can transfer data to PDA 107 via wireless link 116.

The present invention could be implemented on a variety of hardware platforms; FIG. 1A is intended as an example of a heterogeneous computing environment and not as an architectural limitation for the present invention.

Figure 1B:
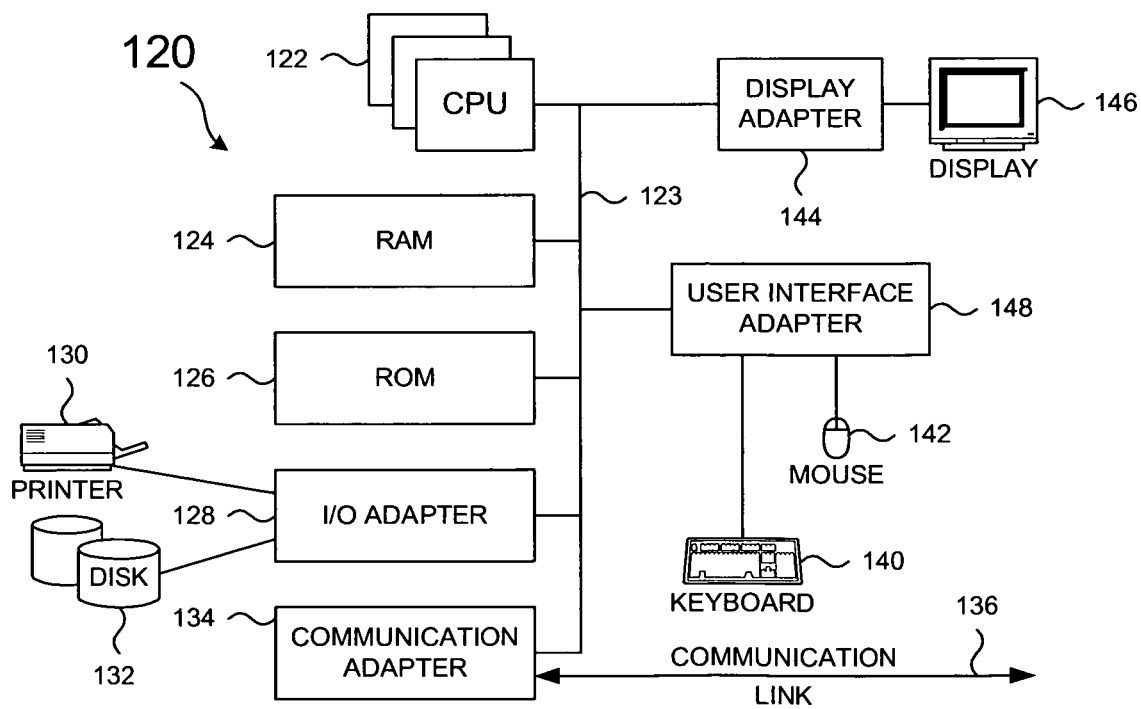
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved data processing system for enhancing the functionality of e-mail applications or similar types of electronic messaging applications. Various embodiments of the present invention are explained in more detail hereinbelow with respect to the remaining figures. It should be noted that the present invention supports electronic messages of many different formats. Although the term "e-mail message" is used throughout the description of the present invention, an e-mail message comprise various types of electronic messages, e.g., text messages, instant messages, fax messages, voicemail messages, video messages, audio messages, and other types of messages; the present invention is applicable to various types of electronic communication applications and/or devices within which the various types of electronic messages can be processed.

With reference now to FIG. 2, a block diagram depicts an exchange of e-mail messages between email applications that have been enhanced to include functionality to implement an embodiment of the present invention. Computing devices 202 and 204 represent one of a variety of possible data processing systems that are able to support an embodiment of the present invention, e.g., such as the data processing systems that are shown in FIG. 1A. Computing devices 202 and 204 support the execution of e-mail applications 206 and 208, respectively, which exchange e-mail messages as a form of electronic communication, e.g., through a LAN, through the Internet, or through some other type of communication link. E-mail applications 206 and 208 have been enhanced to include mandatory response functional units 210 and 212, respectively, which implement the processes of the present invention. E-mail applications 206 and 208 may represent any one of a variety of commercially available e-mail applications, and functional units 210 and 212 may be implemented in many different forms, such as subroutines and/or procedures, applets, plug-ins, ActiveX™ controls, scripts, or any other appropriate form of software module.

As explained above, prior art e-mail applications allow a recipient to determine how quickly he or she will respond to a received e-mail message. For example, a recipient may open an e-mail message that is flagged as highest priority and then decide that the e-mail message does not represent an important matter, after which the recipient postpones the generation of a response. Many business processes are time-critical, though, and there is a need to provide features in e-mail applications that reduce the amount of time between the receipt of an important e-mail message and the generation of a response for that e-mail message.

The present invention addresses this need by enhancing the functionality of an e-mail application in the following manner. A user of e-mail application 206, which contains mandatory response functional unit 210, operates e-mail application 206 to request that an important outgoing e-mail message is flagged as an e-mail message to which its recipient is required to provide a mandatory response. E-mail application 206 relies on functional unit 210 either to assist in the generation of an outgoing message or to perform the necessary modifications to an outgoing message so that it is flagged as an e-mail message to which its recipient is required to provide a mandatory response. For example, email message 214 contains mandatory response flag 216; mandatory response flag 216 acts as an indicator from e-mail application 206 to e-mail application 208 that e-mail message 214 should be handled as an important message with a required mandatory response. Mandatory response flag 216 may be implemented in a variety of data formats, as explained hereinbelow.

After handling e-mail message 214 appropriately, e-mail application 208 transmits its user's response e-mail message 218 to e-mail application 206. In a preferred embodiment, response message 218 is not required to include any type of response flag, response code, or processing status code as additional information that is passed from e-mail application 208 to e-mail application 206. Alternatively, though, response message 218 may contain a response flag, response code, processing status code, or similar type of datum which provides additional information to e-mail application 206 about the manner in which e-mail application 208 and/or its user has handled the receipt of e-mail message 214. A return code allows e-mail application 206 to perform additional appropriate actions, e.g., by informing its user of the manner in which e-mail message 214 was handled by the recipient of e-mail message 214, i.e. the user of e-mail application 208, which may be of interest to the user of e-mail application 206; the optional return code and its associated processing is discussed in more detail further below.

With reference now to FIG. 3, an exemplary dataset is illustrated in which a mandatory response flag may be embedded within a set of e-mail message headers in accordance with an embodiment of the present invention. An e-mail message comprises an envelope, a set of message headers, and the message body, which is the content portion of the e-mail message. The envelope comprises a set of routing headers that are used by the transport protocol for the transmission and delivery of an e-mail message, e.g., as specified SMTP (Simple Mail Transport Protocol). Most e-mail systems support the SMTP protocol for transferring e-mail messages between data processing systems. SMTP can support the transfer of electronic messages that are formatted to conform to its requirements, including messages with text and/or other types of content. Messages headers provide information about the sender and recipient of a message along with information about the manner in which the message should be handled or processed. Most e-mail messages are formatted so that they conform to the standard as described in Resnick et al., "Internet Message Format", RFC (Request for Comments) 2822, 04/2001, which is one of the standards that is available from The Internet Engineering Task Force (IETF); RFC 2822 provides a syntax for text messages. Other standards provide a syntax for supporting other types of content, e.g., as extensions to RFC 822, such as Freed et al., "Multipurpose Internet Mail Extensions (MIME) Part One: Format of Internet Message Bodies", RFC 2054, 11/1996.

Message headers are name-value pairs. Each header is formatted as a single line of text; some of the headers are required, such as "Date", "From", or "To", while other headers are optional but often used, such as "Subject" or "Cc". Any message header that is not recognized by an e-mail application should be ignored, yet all of the headers are propagated between systems, whether or not they are recognized. Extensions or non-standard headers are required to commence as "X-" in order to indicate their non-standard nature.

Referring to FIG. 3, message headers 302 represent a set of message headers that have accompanied a e-mail message body. In one embodiment of the present invention, an e-mail message that requires a mandatory response is flagged by inserting a mandatory response flag as a message header of its accompanying e-mail message; in other words, a mandatory response flag is implemented using a message header as the indicating data field. In a preferred embodiment, the mandatory response flag is implemented as an RFC-2822-compliant header or an extension thereto, as shown in FIG. 3; message header 304 indicates that its accompanying e-mail message should be processed by the receiving e-mail application in a manner that attempts to obtain a mandatory response. Alternatively, the mandatory response flag may be implemented as a MIME header. As yet another alternative, the mandatory response flag may be implemented as a data field that is embedded within another extension message header that has accompanied the e-mail message, in which case the mandatory response flag would occupy only a portion of the extension message header in addition to other information.

With reference now to FIG. 4, an exemplary dataset is illustrated in which a mandatory response flag may be embedded within an e-mail message body in accordance with an embodiment of the present invention. As noted above, an e-mail message comprises its envelope, its set of message headers, and its message body. In contrast to FIG. 3, which illustrates an exemplary embodiment in which a mandatory response flag is implemented as a message header of the e-mail message, FIG. 4 illustrates an exemplary embodiment of the present invention in which a mandatory response flag is implemented as a datum or data field within the message body itself. In this example, a mandatory response flag has been formatted as tag 402 at the end message body 404; in one embodiment, the mandatory response flag may be formatted as markup-language tags, which can be ignored by a processing application if not recognized. The mandatory response flag may appear at any appropriate location within the message body. Other embodiments may simply implement the mandatory response flag as a specially recognized text string, e.g., "*MANDATORY RESPONSE!*", which would not only be programmatically recognized by a processing application but could also be understood by the recipient, i.e. the receiving user.

As mentioned with respect to FIG. 2 above and as discussed in more detail hereinbelow, the returned status codes, i.e. the status codes that may accompany a response message that has been returned in response to a received message that had a mandatory response flag, can also be implemented as a message header, extension header, or within the body of a message.

Figure 5:
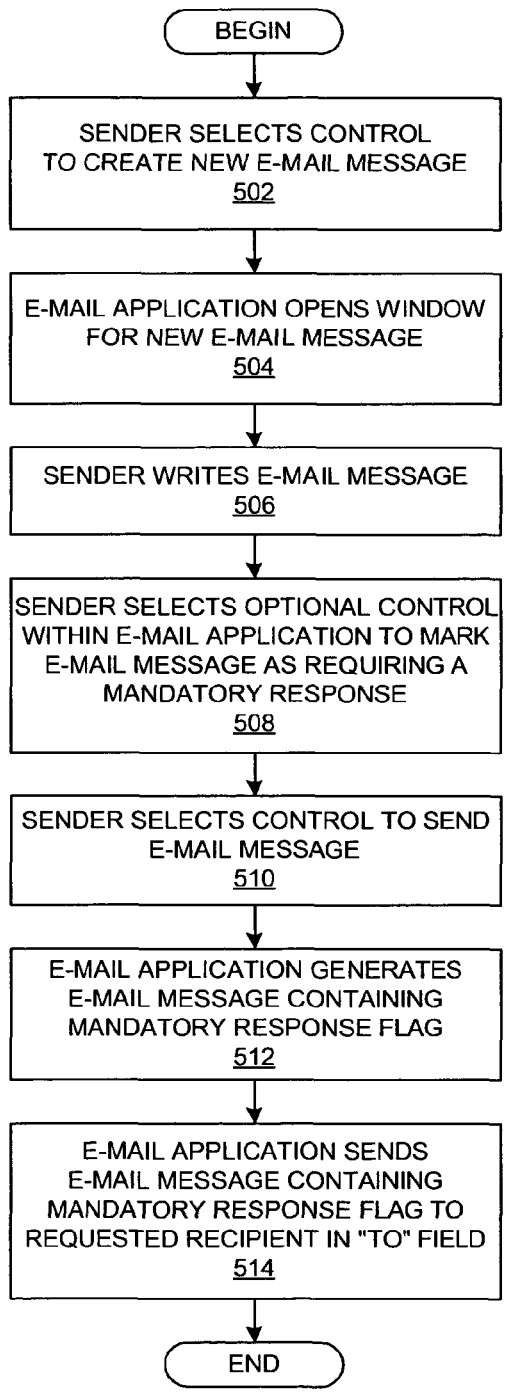
FIG. 5 depicts a flowchart that shows a process in which a sender creates an e-mail message that contains a request for a mandatory response for the e-mail message.

With reference now to FIG. 5, a flowchart depicts a process in which a sender creates an e-mail message that contains a request for a mandatory response for the e-mail message in accordance with an embodiment of the present invention. The process commences with the sender, i.e. the sending user, selecting a graphical user interface (GUI) control within an e-mail application in order to initiate the creation of an e-mail message (step 502); the instance of the e-mail application is similar to e-mail application 206 that is shown in FIG. 2, which has been enhanced to include functionality that supports the implementation of a mandatory response flag. The e-mail application opens a window for the creation of the new e-mail message (step 504), and the sender writes the e-mail message with input to a computing device (step 506).

The sender then selects an optional control within the e-mail application to mark the e-mail message as requiring a mandatory response (step 508), e.g., by pushing a GUI button, by selecting a GUI checkbox, or in some other manner. It should be noted, though, that the functionality of the present invention may be invoked through a variety of interfaces and mechanisms, e.g., including text-based command lines. It should also be noted that the functionality of the present invention is not necessarily invoked via user input or user interaction by the sender; the request for a mandatory response may be automatically and programmatically generated in certain circumstances, e.g., as configured by an administrative user or based on the application of an enterprise policy manager that determines certain operational conditions in which messages from/to certain persons, roles, groups, projects, etc., are processed to include mandatory response flags.

At some point in time, the user requests to send the newly written e-mail message (step 510), e.g., by selecting a "SEND" button in the e-mail application, and the e-mail application generates an e-mail message that contains the newly written content in the message body and that also contains the mandatory response flag (step 512). The e-mail application sends the e-mail message containing the mandatory response flag to the requested recipient(s) in the "TO" field or message header of the message (step 514), and the process at the message-originating data processing system is concluded.

Figure 6:
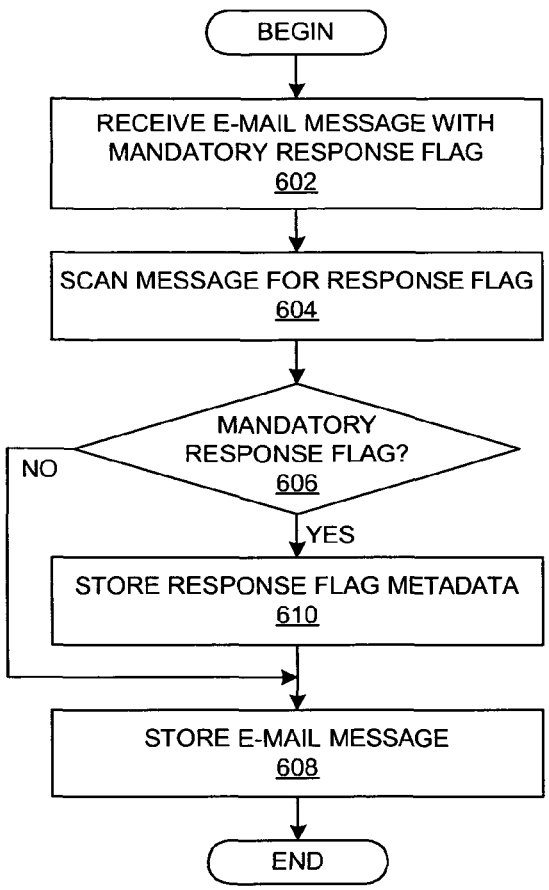
FIG. 6 depicts a flowchart that shows a process in which a receiving data processing system processes an e-mail message that contains a mandatory response flag.

With reference now to FIG. 6, a flowchart depicts a process in which a receiving data processing system processes an e-mail message that contains a mandatory response flag in accordance with an embodiment of the present invention. The process commences with the receipt of an e-mail message that might contain a mandatory response flag (step 602), and an e-mail application on a computing device at the receiving end of the transmission lexically scans or otherwise analyzes the received e-mail message for a mandatory response flag (step 604); the instance of the e-mail application is similar to e-mail application 208 that is shown in FIG. 2, which has been enhanced to include functionality that supports the usage of a mandatory response flag. If the received e-mail message does not contain a mandatory response flag (step 606), then the e-mail message is stored for subsequent retrieval and user review (step 608), thereby concluding the process.

However, if it is determined that the received e-mail message contains a mandatory response flag at step 606, then the e-mail application stores metadata in association with the e-mail message (step 610) such that the metadata reflects that the e-mail message contains a mandatory response flag. Step 610 is not necessary because the e-mail application could check each e-mail message individually with respect to a mandatory response flag whenever an action needs to be performed on the e-mail message and whenever the action would be affected by the presence of a mandatory response flag in the e-mail message; however, in some cases, it may be more convenient programmatically to check each incoming message one time as an initial step in the overall process. The process then continues by storing the e-mail message at step 608, and the process is concluded. In this manner, if an e-mail message does not contain a mandatory response flag, then the e-mail message continues to be processed in a manner that is known in the prior art; otherwise, additional features of the present invention are available to be applied against the e-mail message, as described in more detail hereinbelow.

Figure 7:
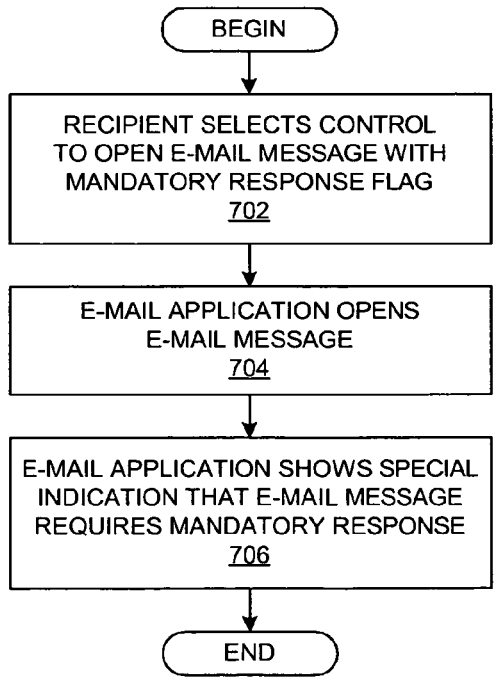
FIG. 7 depicts a flowchart that shows a process in which a recipient opens an email message that contains a mandatory response flag.

With reference now to FIG. 7, a flowchart depicts a process in which a recipient opens an email message that contains a mandatory response flag. The process commences with the recipient, i.e. the receiving user, selecting a control within an e-mail application to open an e-mail message (step 702), and the e-mail application opens the selected e-mail message (step 704). The e-mail application may optionally show a special indication that the selected e-mail message requires a mandatory response (step 706), and the process of opening the message is concluded. The e-mail application may indicate the presence of a mandatory response flag: using a message within a pop-up window; other information within a status bar; through the use of colors on a display screen; or through some other means of alerting the user.

Figure 8:
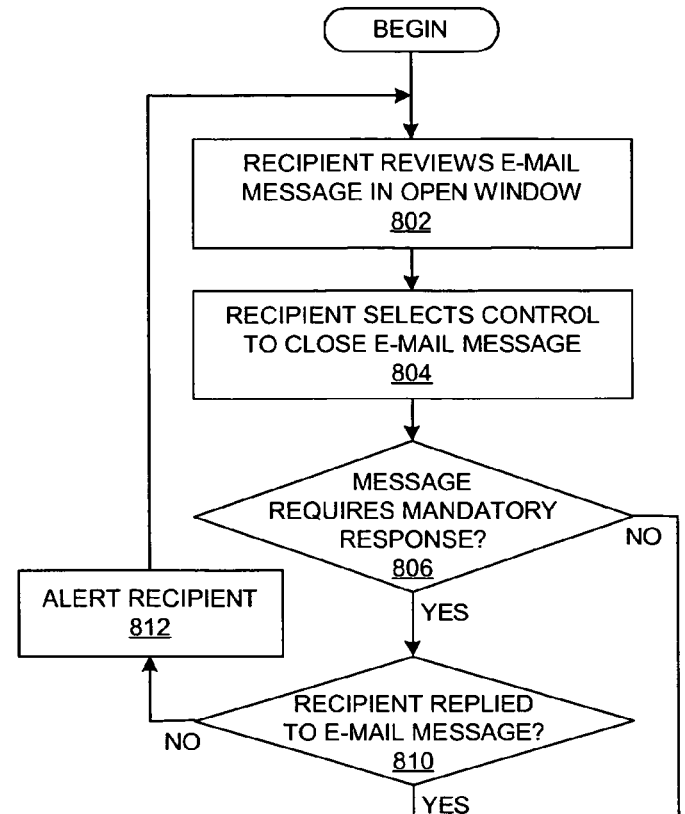
FIG. 8 depicts a flowchart that shows a process in which a recipient attempts to disregard the requirement of a mandatory response with respect to an e-mail message that the recipient is viewing by attempting to close the e-mail message.

With reference now to FIG. 8, a flowchart depicts a process in which a recipient attempts to disregard the requirement of a mandatory response with respect to an e-mail message that the recipient is viewing by attempting to close the e-mail message. The process commences with the recipient, i.e. the receiving user, reviewing an e-mail message within a GUI window of an e-mail application (step 802). The recipient selects a control to close the e-mail message (step 804), e.g., by selecting a menu item or a close box. The e-mail application then determines whether or not the e-mail message was flagged as requiring a mandatory response (step 806), e.g., either by checking the metadata that is associated with the e-mail message or by scanning the e-mail message itself. If the e-mail message does not have an associated mandatory response flag, then the e-mail application closes the e-mail message or its window (step 808), whichever is appropriate, and the process is concluded.

Figure 9:
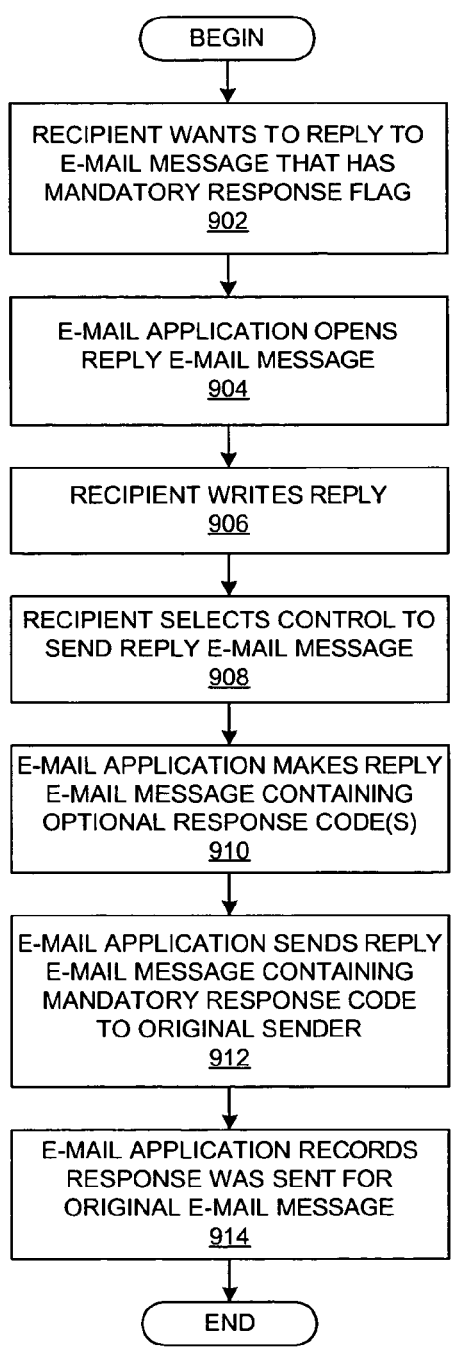
FIG. 9 depicts a flowchart that shows a process in which a recipient replies to a reviewed e-mail message that contains a mandatory response flag.

However, if the e-mail message does have an associated mandatory response flag, then the e-mail application checks whether or not the user has replied to the e-mail message (step 810). If a reply has been made for the e-mail message, then the e-mail application closes the e-mail message at step 808, and the process is concluded. However, if a reply has not been made for the e-mail message, then the recipient is alerted (step 812), and the process loops back to step 802 so that the user can continue reviewing the e-mail message until the user generates a reply message, e.g., in the manner that is shown in FIG. 9. In this manner, the e-mail application strictly adheres to a requirement that the user must reply to the received e-mail message in some manner before the e-mail application will allow the user to perform some other action; alternative processes for this situation are discussed further below.

With reference now to FIG. 9, a flowchart depicts a process in which a recipient replies to a reviewed e-mail message that contains a mandatory response flag in accordance with an embodiment of the present invention. The process commences with the recipient, i.e. the receiving user, already reviewing an e-mail message, e.g., as described with respect to FIG. 7. The recipient then selects a control, e.g., by pushing a GUI button, to reply to the e-mail message that the recipient is already reviewing (step 902), i.e. the message that contains the mandatory response flag. The e-mail application opens a window that allows a user to compose a reply e-mail message (step 904), and the recipient writes the e-mail message (step 906). The recipient then selects a control to send the reply e-mail message (step 908), and the e-mail application generates a reply e-mail message that contains the newly written response as a message body (step 910); optionally, the e-mail application may also support the use of mandatory-response return status codes, which would also be included within the reply e-mail message.

The email application then sends the reply e-mail message to the sender of the original message, e.g., using the e-mail address that was contained within the "FROM" message header or the "REPLY-TO" message header of the original message (step 912). The e-mail application then records that a response was returned for the original e-mail message by storing metadata that is associated with the original e-mail message (step 914), and the process is concluded.

Figure 10:
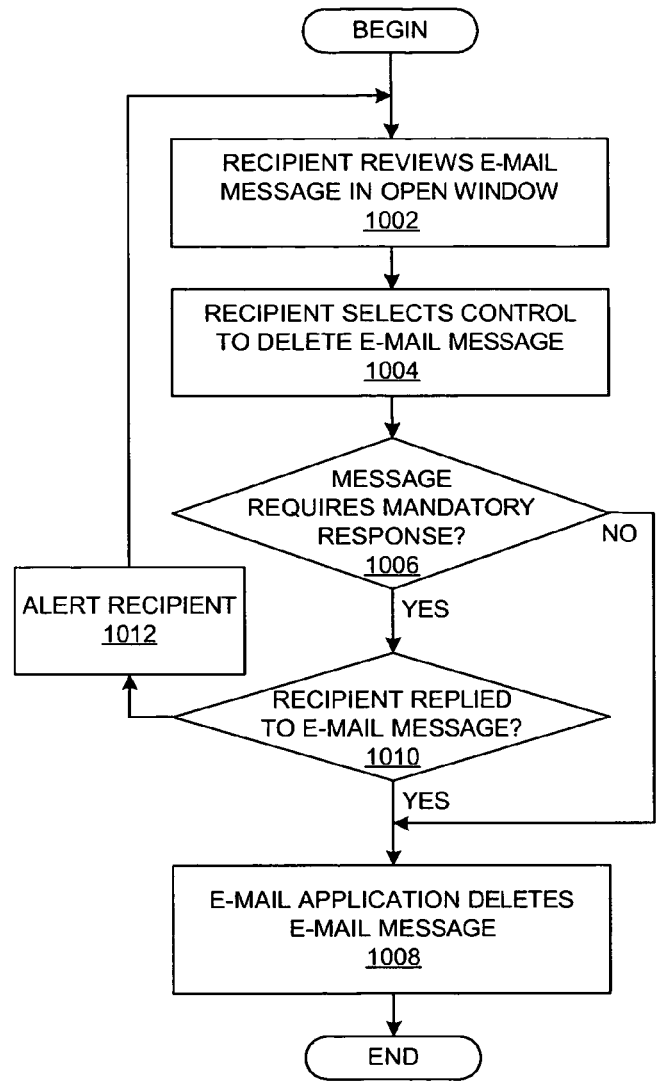
FIG. 10 depicts a flowchart that shows a process in which a recipient attempts to disregard the requirement of a mandatory response with respect to an e-mail message that the recipient is viewing by attempting to delete the message.

With reference now to FIG. 10, a flowchart depicts a process in which a recipient attempts to disregard the requirement of a mandatory response with respect to an e-mail message that the recipient is viewing by attempting to delete the message. The process commences with the recipient, i.e. the receiving user, reviewing an e-mail message within a GUI window of an e-mail application (step 1002). The recipient selects a control to delete the e-mail message (step 1004), e.g., by selecting a menu item or a close box. The e-mail application then determines whether or not the e-mail message was flagged as requiring a mandatory response (step 1006), e.g., either by checking the metadata that is associated with the e-mail message or by scanning the e-mail message itself. If the e-mail message does not have an associated mandatory response flag, then the e-mail application deletes the e-mail message (step 1008), and the process is concluded.

However, if the e-mail message does have an associated mandatory response flag, then the e-mail application checks whether or not the user has replied to the e-mail message (step 1010). If a reply has been made for the e-mail message, then the e-mail application deletes the e-mail message at step 1008, and the process is concluded. However, if a reply has not been made for the e-mail message, then the recipient is alerted (step 1012), and the process loops back to step 1002 so that the user can continue reviewing the e-mail message until the user generates a reply message, e.g., in the manner that is shown in FIG. 9. In this manner, the e-mail application strictly adheres to a requirement that the user must reply to the received e-mail message in some manner before the e-mail application will allow the user to perform some other action; alternative processes for this situation are discussed further below.

With reference now to FIGS. 11A-11D, a set of diagrams represent a set of GUI windows through which an e-mail application alerts a user by displaying warning messages and error messages to the user as a result of a user action when the e-mail application has an e-mail message that contains a mandatory request flag. FIGS. 11A-11D may be used in different scenarios depending upon the manner in which the enhanced e-mail application is implemented or configured to handle an e-mail message that contains a mandatory response flag. Other scenarios could be handled in different ways that are not illustrated within FIGS. 11A-11D, and these different processes would also be considered as embodiments of the present invention because each different process would represent a different way of attempting to fulfill a request from the sender of the original message that the recipient should or must provide a reply message in response to the original message.

Figure 11A:
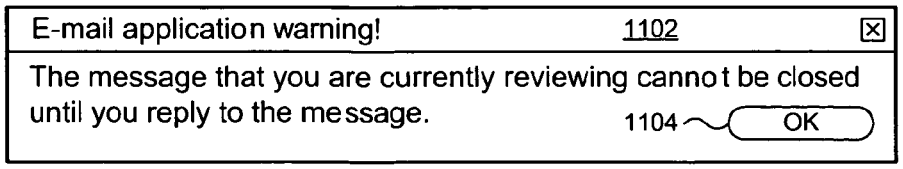
FIGS. 11A-11D depicts a set of diagrams that represent a set of GUI windows through which an e-mail application alerts a user by displaying warning messages and error messages to the user as a result of a user action when the e-mail application has an e-mail message that contains a mandatory request flag.

Referring now to FIG. 11A, window 1102 is displayed to the recipient, and window 1102 contains an error message for the recipient that informs the user that the user must reply to the message that is being reviewed before closing the e-mail message; "OK" button 1104 allows the user to close window 1102 and return to reviewing the e-mail message. Window 1102 might be displayed during the process that is shown in FIG. 8, while a similar window might be displayed during the process that is shown in FIG. 10. FIG. 8 and FIG. 10 illustrate a strict process in which a user is not permitted to perform another action with respect to a message that contains a mandatory response flag unless the user first responds or replies to the message, thereby fulfilling the request of the sender of the message that the user must respond to the message. In the examples that are shown in FIG. 8 and FIG. 10, the recipient's e-mail application enforces this requirement strictly; in FIG. 8, the user must respond while reviewing the message, preferably as a requirement upon first reviewing the e-mail message by the recipient, while in FIG. 10, the user must respond before deleting the message, e.g., in a case in which the user attempts to delete the message without reading it.

Figure 11B:
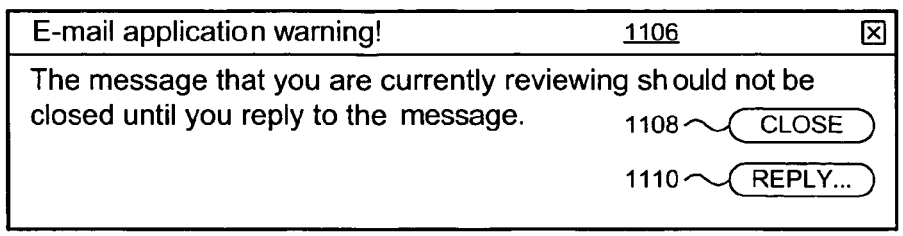

Referring now to FIG. 11B, window 1106 is displayed to the recipient at a similar point in time as described with respect FIG. 8, i.e. a recipient of the original e-mail message has attempted to close an e-mail message after reviewing the e-mail message without replying to the e-mail message. Window 1106 contains an error message for the recipient that informs the user that the user should reply to the message that is being reviewed before closing the e-mail message; "CLOSE" button 1108 allows the user to continue to close the e-mail message without creating a replay message, while "REPLY . . . " button 1110 closes window 1106 and then creates an input window for the user to compose the reply e-mail message.

Figure 11C:
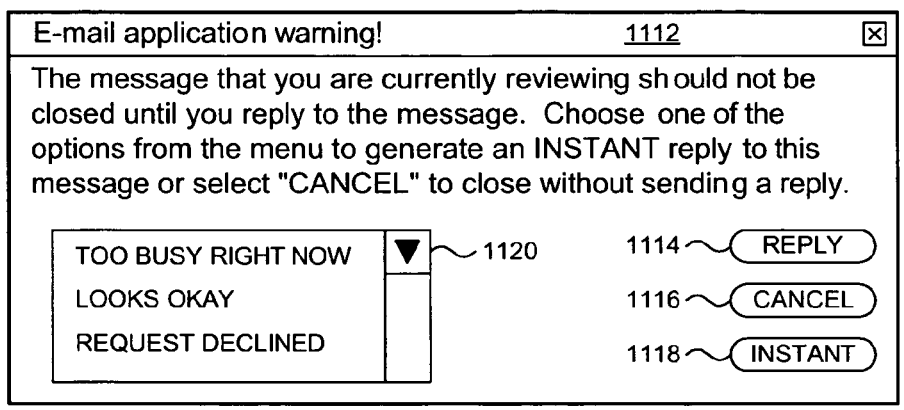

Referring now to FIG. 11C, window 1112 is displayed to the recipient at a similar point in time as described with respect to FIG. 8, i.e. a recipient of the original e-mail message has attempted to close an e-mail message after reviewing the e-mail message without replying to the e-mail message. Window 1112 contains an error message for the recipient that informs the user that the user should reply to the message that is being reviewed before closing the e-mail message. "REPLY . . . " button 1114 closes window 1106 and then creates an input window for the user to compose the reply e-mail message, and "CANCEL" button 1116 allows the user to continue to close the e-mail message without creating a reply message. "INSTANT" button 1118 closes window 1112 and then creates a reply e-mail message with an automatically generated reply message in which the message body is predetermined or pre-configured; in this example, when "INSTANT" button 1118 is selected, the e-mail application determines which menu item within menu 1120 has been selected by the user as a quick response to the original e-mail message, thereby fulfilling the sender's request that the recipient is required to provide a mandatory response. The text strings that are used as menu items may be obtained in a variety of manners. For example, the text strings may be required and standardized within a data format specification, e.g., in a standard similar to RFC 2822. Alternatively, the text strings may be configurable through the enhanced e-mail application by allowing user-specifiable or system-administrator-specifiable parameters. As another alternative, the text strings may be extracted from the original e-mail message that was received from the sender, in which case the text strings may have been configured as user-specifiable or system-administrator-specifiable parameters in the sender's instance of the enhanced e-mail application.

Figure 11D:
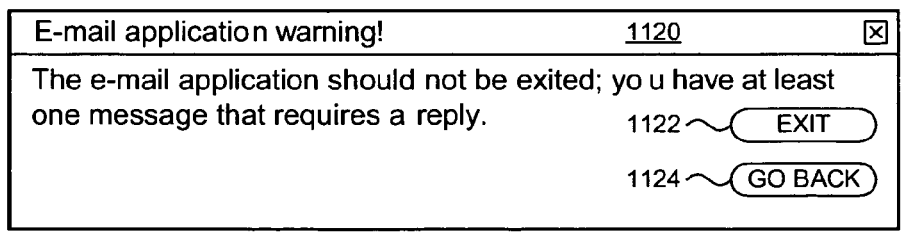

Referring now to FIG. 11D, window 1120 is displayed to the recipient when the recipient of the original e-mail message has attempted to exit the e-mail application without replying to an e-mail message that contains a request for a mandatory response. In this example, the user can select "GO BACK" button 1122 to return to the e-mail application to reply to one of the e-mail messages, which might be emphasized within a list of messages in some visual manner to indicate that it requires a mandatory response. Otherwise, the user can select "EXIT" button 1124 to continue to exit the e-mail application.

As noted above, FIGS. 11A-11D may be used in different scenarios depending upon the manner in which the enhanced e-mail application is implemented or configured to handle an e-mail message that contains a mandatory response flag. The recipient is prompted to perform a mandatory action or a suggested action in response to attempting to perform another action without replying to the original e-mail message; in some cases, the recipient is provided with options that delay the creation of a response to the original e-mail message. In one embodiment, these different processing options may be configurable through the enhanced e-mail application by allowing user-specifiable or system-administrator-specifiable parameters.

Alternatively, the different processing options for handling the user's actions with respect to a mandatory response flag may be suggested and/or standardized within a data format specification, e.g., in a private specification that is proprietary to the creator of the e-mail application or in a public standard similar to RFC 2822. For example, a message header, a message body tag, etc., that represents a mandatory response flag may contain one or more standardized data values that indicate one or more processing options; in this manner, the sending e-mail application informs the receiving e-mail application of the processing option that is expected to be performed by the receiving e-mail application. After extracting and storing a mandatory response flag from a received e-mail message, the receiving e-mail application would tailor its execution in accordance with the one or more indicated processing options in the mandatory response flag. In the examples that are shown in FIG. 3 and FIG. 4, the mandatory response flags contain a "1.0" data value; these particular mandatory response flags may instruct the receiving e-mail application to require strict adherence to the requirement that the recipient must respond to the received e-mail message as soon as possible: (A) when the recipient first reviews the e-mail message, as shown in FIG. 8; (B) before the recipient can delete the e-mail message, as shown in FIG. 10; and/or (C) before the recipient can exit the e-mail application, as suggested in FIG. 11D. Other data values would instruct the receiving e-mail application to perform different actions in response to the recipient's actions, e.g., as suggested in FIG. 11B and FIG. 11C.

Likewise, a message header, a message body tag, etc., that represents a mandatory response flag may contain one or more standardized data values that indicate one or more types of status codes that are to be returned to the sending e-mail application. For example, the receiving e-mail application might collect information about the manner in which the recipient responded to requests to generate a reply message for the mandatory response flag, e.g., the number of requests to generate a reply message that the recipient ignored. As another example, the receiving e-mail application might measure the amount of time that elapsed between the time at which the user first reviewed the received e-mail message to the time at which the user created the reply message for the received e-mail message. The recipient could be informed through the warning or error message windows about the information that is being collected by the receiving e-mail application.

The present invention provides features within an e-mail application that reduces the amount of time between the receipt of an important e-mail message and the generation of a response for that e-mail message. However, as mentioned above, many business processes are time-critical, and the features of the present invention may be abused through overuse by many people. For example, too many people might flag e-mail messages as requiring a mandatory response, in which case an email system could degenerate into a scenario in which almost every e-mail message was marked as important enough to require a mandatory response, thereby causing users to ignore most requests for mandatory responses. The present invention addresses this potential problem by examining incoming messages with mandatory response flags, as explained in more detail below.

Figure 12:
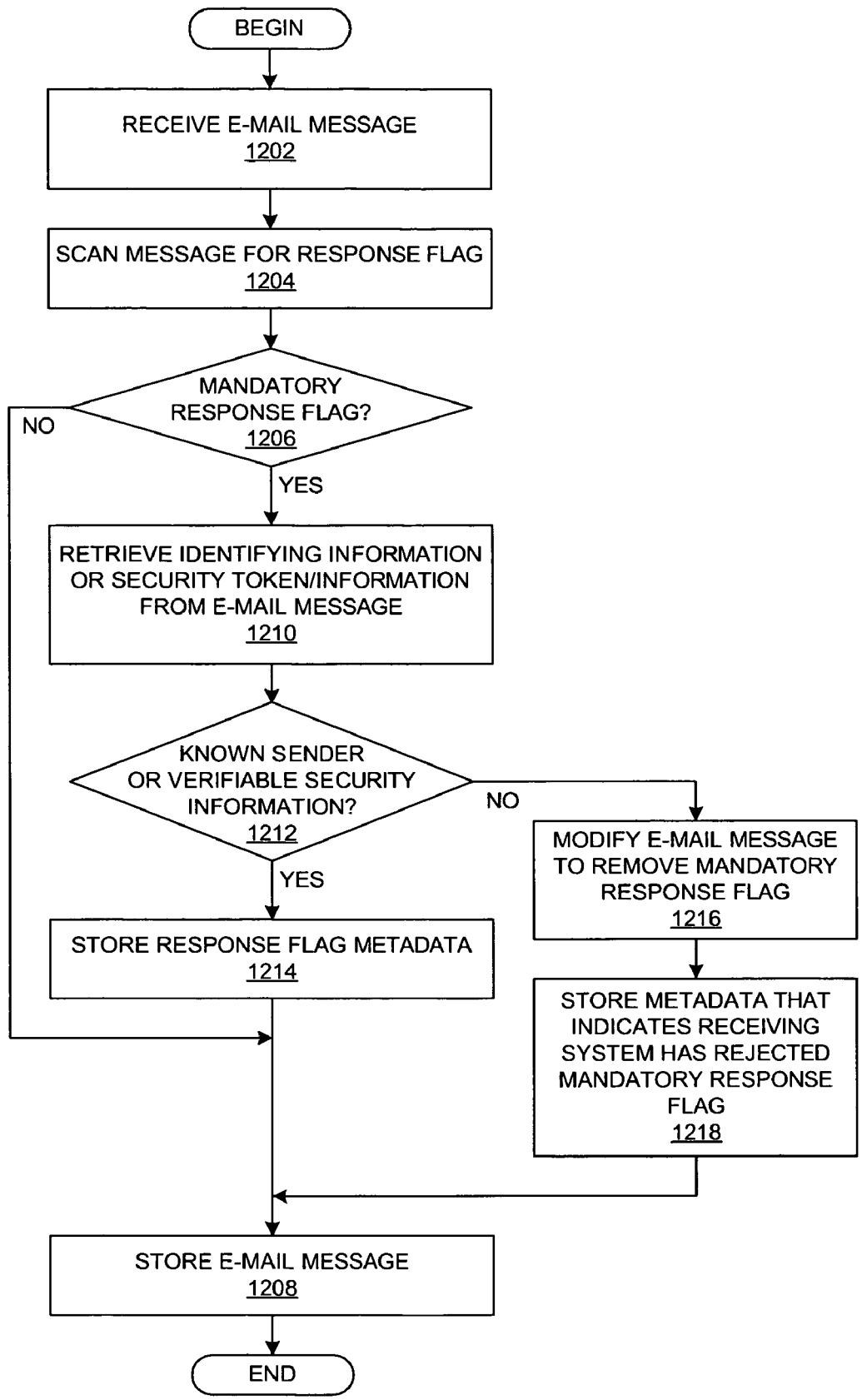
FIG. 12 depicts a flowchart that shows a process in which the usage of mandatory response flags is monitored by an email application.

With reference now to FIG. 12, a flowchart depicts a process in which the usage of mandatory response flags is monitored by an email application in accordance with an embodiment of the present invention. In general, FIG. 12 illustrates a process in which a message with a mandatory response flag is analyzed by the receiving e-mail application to ensure that the message contains some form of information on which the receiving e-mail application can make a determination that the recipient would authorize the sender to request a mandatory response for incoming messages.

The process commences when the receiving e-mail application receives an e-mail message for a recipient from a sender (step 1202), and the receiving e-mail application scans the received e-mail message for a mandatory response flag (step 1204). A determination is made as to whether or not a mandatory response flag is present (step 1206); if not, the e-mail message is processed and stored in a normal fashion (step 1208), and the process is concluded.

If the receiving e-mail message contains a mandatory response flag, then the receiving e-mail application retrieves sender identifying information from the received e-mail message or a security token and/or other security-related information from the receiving e-mail message (step 1210). For example, the sender identifying information may be represented as the sender's e-mail address, which is contained in a "FROM" message header. A security token or other security-related information might be stored within a MIME extension of the received e-mail message.

The receiving e-mail application then determines whether the sender identifying information is known to the receiving e-mail application or whether the security token or other security information is verifiable (step 1212). For example, the sender identifying information might be checked against a special database, a configurable datastore, or the recipient's e-mail address book; hence, a sender is known to the recipient if the recipient's e-mail address book contains the sender's e-mail address. In the case in which a security token or security-related information is contained in the received e-mail message, the receiving e-mail message would attempt to verify the security information, e.g., by verifying a digital signature on a security token using the public key from the sender's public key certificate.

If the sender is known to the recipient or the security information can be verified, then the receiving e-mail application stores the mandatory response flag as meta-data in association with the received e-mail message (step 1214), e.g., within an internal data structure or e-mail database for subsequent use as previously described above. In this manner, the receiving e-mail application performs certain determinations about whether the incoming e-mail message has originated from a sender who has privileges or is otherwise authorized or recognized to be able to request a mandatory reply in response to the receipt of the sender's e-mail message. The e-mail message is then processed and stored in a normal fashion at step 1208, and the process is concluded.

If the sender is not known to the recipient or the security information cannot be verified at step 1212, then the receiving e-mail application determines that the incoming e-mail message has not originated from a sender who has privileges or is otherwise authorized or recognized to be able to request a mandatory reply in response to the receipt of the sender's e-mail message. Hence, the receiving e-mail application modifies the e-mail message to remove the mandatory response flag (step 1216), e.g., by deleting the appropriate message header or message body tag or text string. In this manner, the mandatory response flag does not subsequently cause the e-mail application to bother the recipient to reply to the received e-mail message in a mandatory way, e.g., as illustrated in FIGS. 11A-11D. However, the receiving e-mail application may store this fact as metadata in association with the e-mail message in order to record the fact that the request for a mandatory response was rejected by the receiving e-mail application (step 1218). The e-mail message is then processed and stored in a normal fashion at step 1208, and the process is concluded.

Using the exemplary process that is shown in FIG. 12 or through the use of a similar authorization or recognition mechanism, the present invention supports functionality that allows an e-mail application to control usage of the user-selectable mandatory response feature, thereby providing a mechanism for preventing the degenerated scenario that was mentioned hereinabove. It should be noted that the manner in which the e-mail application filters the received e-mail messages may be configurable by a user or by a system administrator, e.g., through the use of policies that are applied and evaluated against the incoming e-mail messages.

Figure 13:
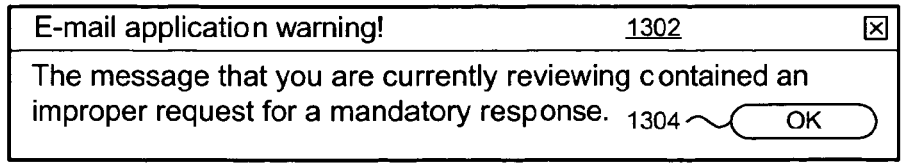
FIG. 13 depicts a diagram that shows a GUI window through which an e-mail application displays a warning message to a user for an improper mandatory response flag.

With reference now to FIG. 13, a diagram represents a GUI window through which an e-mail application displays a warning message to a user for an improper mandatory response flag. As illustrated in FIG. 12, a receiving e-mail application may filter the incoming e-mail messages to determine if they contain a mandatory response flag from a sender that is not authorized or otherwise allowed to make such requests. Window 1302 informs the user that an e-mail message contained an unauthorized or improper mandatory request flag, and "OK" button 1304 allows the user to return to the user's current operation, e.g., reviewing the e-mail message.

The present invention is particularly useful when combined with calendar functionality. For example, the present invention may be used to request that a user should attend a specified meeting that cannot be held unless each recipient of a meeting request message positively responds to the meeting request message. If a user were to open the e-mail application and then exit the e-mail application without reviewing the meeting request message, then the user might not notice that the meeting request message was listed within an inbox folder; with the present invention, assuming that the meeting request message contains a mandatory response flag, the user's attention would be directed to the meeting request message via a warning message when the user attempted to exit the e-mail application. The user would then become aware of the pending, time-critical message, and the user could accept or decline the meeting invitation. In this example, to address the issue of overuse as discussed with respect to FIG. 12, a calendar application might be configured to demarcate any appointment and meeting messages that it generates with mandatory response flags; the calendar application could be configured to include security-related information or tokens that are programmatically available or shared between enterprise applications.

The advantages of the present invention should be apparent in view of the detailed embodiments of the present invention that have been discussed hereinabove. The present invention provides a mechanism for requiring a response from a recipient with respect to a sender's electronic message. A messaging client recognizes a message that was flagged for a mandatory response and may prevent the recipient from closing a review of the message or from deleting the message without first responding to the message. This mechanism can be used by a sender to ensure that a message will not be ignored and that a timely response will be obtained with minimal impact to the working environment of the recipient.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing electronic messages within data processing systems, the method comprising:

receiving an electronic message for a recipient from a sender;

extracting information from the electronic message;

detecting that the electronic message contains a data field that indicates a request by the sender for a response from the recipient of the electronic message;

determining, based on the information extracted, whether the sender is authorized to send the electronic message containing the data field to the recipient, wherein determining whether the sender is authorized further comprises:

determining whether a return address for the sender that has been extracted from the electronic message is stored within a datastore of the recipient; and verifying security information that has been extracted from the electronic message;

responsive to a determination that the sender is not authorized, modifying the electronic message to remove the data field that indicates the request by the sender for the response from the recipient of the electronic message;

responsive to a determination that the sender is authorized, alerting the recipient to the request detected for the response to the electronic message, wherein alerting the recipient further comprises:

presenting at least one choice to the recipient that allows the recipient to delay creation of the response; and presenting at least one choice to the recipient that allows the recipient to create the response to the electronic message, wherein the response contains predetermined content, wherein the predetermined content is configurable by the recipient, and wherein the predetermined content is extracted from the received electronic message;

responsive to alerting the recipient, requiring actions by the recipient with respect to usage of a data processing system until the recipient uses the data processing system to send the response to the sender, wherein the actions required are indicated within the data field;

preventing the recipient from deleting the electronic message until the recipient uses the data processing system to send the response to the sender; and preventing the recipient from closing a review of the electronic message until the recipient uses the data processing system to send the response to the sender.

2. A computer program product on a non-transitive computer readable storage medium for use in a data processing system for processing electronic messages, the computer program product comprising:

instructions for receiving an electronic message for a recipient from a sender;

instructions for extracting information from the electronic message;

instructions for detecting that the electronic message contains a data field that indicates a request by the sender for a response from the recipient of the electronic message;

instructions for determining, based on the information extracted, whether the sender is authorized to send the electronic message containing the data field to the recipient, wherein determining whether the sender is authorized further comprises:

instructions for determining whether a return address for the sender that has been extracted from the electronic message is stored within a datastore of the recipient; and instructions for verifying security information that has been extracted from the electronic message;

instructions for, responsive to a determination that the sender is not authorized, modifying the electronic message to remove the data field that indicates the request by the sender for the response from the recipient of the electronic message;

instructions for, responsive to a determination that the sender is authorized, alerting the recipient to the request detected for the response to the electronic message, wherein alerting the recipient further comprises:

instructions for presenting at least one choice to the recipient that allows the recipient to delay creation of the response; and instructions for presenting at least one choice to the recipient that allows the recipient to create the response to the electronic message, wherein the response contains predetermined content, wherein the predetermined content is configurable by the recipient, and wherein the predetermined content is extracted from the received electronic message;

instructions for, responsive to alerting the recipient, requiring actions by the recipient with respect to usage of a data processing system until the recipient uses the data processing system to send the response to the sender, wherein the actions required are indicated within the data field;

instructions for preventing the recipient from deleting the electronic message until the recipient uses the data processing system to send the response to the sender; and instructions for preventing the recipient from closing a review of the electronic message until the recipient uses the data processing system to send the response to the sender.

3. An apparatus for processing electronic messages, the apparatus comprising:

a bus system;

a memory connected to the bus system, wherein the memory includes a set of instructions; and a processing unit connected to the bus, wherein the processing unit executes the set of instructions to receive an electronic message for a recipient from a sender; extract information from the electronic message; detect that the electronic message contains a data field that indicates a request by the sender for a response from the recipient of the electronic message; determine, based on the information extracted, whether the sender is authorized to send the electronic message to the recipient, wherein determining whether the sender is authorized further comprises:

further executing the set of instructions to determine whether a return address for the sender that has been extracted from the electronic message is stored within a datastore of the recipient; and verify security information that has been extracted from the electronic message;

responsive to a determination that the sender is not authorized, modify the electronic message to remove the data field that indicates the request by the sender for the response from the recipient of the electronic message;

responsive to a determination that the sender is authorized, alert the recipient to the request detected for the response to the electronic message, wherein alerting the recipient further comprises:

further executing the set of instructions to present at least one choice to the recipient that allows the recipient to delay creation of the response; and present at least one choice to the recipient that allows the recipient to create the response to the electronic message in which the response contains predetermined content, wherein the predetermined content is configurable by the recipient, and wherein the predetermined content is extracted from the received electronic message;

responsive to alerting the recipient, require actions by the recipient with respect to usage of a data processing system until the recipient uses the data processing system to send the response to the sender, wherein the actions required are indicated within the data field; prevent the recipient from deleting the electronic message until the recipient uses the data processing system to send the response to the sender; and prevent the recipient from closing a review of the electronic message until the recipient uses the data processing system to send the response to the sender.

* * * * *